United States Patent
Caruel et al.

(10) Patent No.: US 11,486,333 B2
(45) Date of Patent: Nov. 1, 2022

(54) THRUST REVERSER WITH A C-SHAPED MOVABLE STRUCTURE FOR AN AIRCRAFT PROPULSION UNIT, AND METHOD FOR MAINTAINING THE SAME

(71) Applicant: Safran Nacelles, Gonfreville l'Orcher (FR)

(72) Inventors: Pierre Caruel, Moissey Cramayel (FR); Shwetanjana Anand, Gonfreville l'Orcher (FR); Patrick Boileau, Moissey Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 7 days.

(21) Appl. No.: 17/191,106

(22) Filed: Mar. 3, 2021

(65) Prior Publication Data
US 2021/0190005 A1 Jun. 24, 2021

Related U.S. Application Data

(63) Continuation of application No. PCT/FR2019/052045, filed on Sep. 4, 2019.

(30) Foreign Application Priority Data

Sep. 7, 2018 (FR) .................................... 18/58046

(51) Int. Cl.
*F02K 1/72* (2006.01)
*F02K 1/76* (2006.01)
*B64D 29/08* (2006.01)

(52) U.S. Cl.
CPC ................ *F02K 1/72* (2013.01); *B64D 29/08* (2013.01); *F02K 1/763* (2013.01)

(58) Field of Classification Search
CPC ............ F02K 1/72; F02K 1/763; B64D 29/08
See application file for complete search history.

(56) References Cited

U.S. PATENT DOCUMENTS

| 2010/0107599 A1* | 5/2010 | Vauchel | B64D 29/08 |
| | | | 244/110 B |
| 2011/0062279 A1 | 3/2011 | Welch et al. | |

(Continued)

FOREIGN PATENT DOCUMENTS

| FR | 2914700 | 10/2008 |
| FR | 2952908 | 5/2011 |

OTHER PUBLICATIONS

International Search Report for International Application PCT/FR2019/052045, dated Dec. 19, 2019.

*Primary Examiner* — Andrew H Nguyen
(74) *Attorney, Agent, or Firm* — Burris Law, PLLC

(57) ABSTRACT

A thrust reverser for an aircraft propulsion assembly includes a movable structure provided with external covers connected to hinges through a pivot connection allowing the external covers to rotate between a closed position and a maintenance position. The hinges are connected to secondary rails rigidly attached to an engine pylon through a sliding connection allowing the external covers to move in translation between a direct thrust position and a reverse thrust position. The hinges and the secondary rails are independent of beams to which the parts of the movable structure other than the external covers are connected. A method for maintaining an aircraft propulsion unit is also disclosed. The method includes positioning of the external covers in maintenance position followed by a placement of the beams and of the parts of the movable structure other than the external covers.

9 Claims, 7 Drawing Sheets

(56) References Cited

U.S. PATENT DOCUMENTS

| | | | |
|---|---|---|---|
| 2014/0234090 A1* | 8/2014 | Hurlin | F02K 1/72 |
| | | | 415/182.1 |
| 2015/0122943 A1* | 5/2015 | Wu | B64D 27/26 |
| | | | 244/54 |
| 2016/0025039 A1* | 1/2016 | Boileau | F02K 1/09 |
| | | | 239/265.19 |
| 2017/0089297 A1* | 3/2017 | Boileau | F02K 1/625 |

* cited by examiner

THRUST REVERSER WITH A C-SHAPED MOVABLE STRUCTURE FOR AN AIRCRAFT PROPULSION UNIT, AND METHOD FOR MAINTAINING THE SAME

CROSS-REFERENCE TO RELATED APPLICATIONS

This application is a continuation of International Application No. PCT/FR 2019/052045, filed on Sep. 4, 2019, which claims priority to and the benefit of FR 18/58046 filed on Sep. 7, 2018. The disclosures of the above applications are incorporated herein by reference.

FIELD

The present disclosure relates to the field of thrust reversers for aircraft propulsion units, more particularly thrust reversers comprising a structure movable in translation between a direct thrust position and a thrust reversal position.

BACKGROUND

The statements in this section merely provide background information related to the present disclosure and may not constitute prior art.

Conventional thrust reversers include a movable structure formed by two half-structures. Typically, such a movable structure, called C-shaped (C-Duct), is adapted to be placed in a maintenance position by outward opening of the half-structures. FIG. 14 shows a propulsion unit 1 of a conventional thrust reverser with a movable structure 41 in the maintenance position.

When the engine of such a propulsion unit has to be put off, it is generally desirable to put off the entire thrust reverser beforehand given the bulk of the half-structures and the limited opening stroke in particular because of the presence of the front frame. All the more so, when the thrust reverser comprises movable cascade vanes, these wrap the engine even when the movable structure is backward, thereby inhibiting a dismount of the engine.

A subsequent operation of dismounting a conventional thrust reverser and the engine is illustrated in FIGS. 15 and 16. FIG. 15 shows the thrust reverser in the initial position, fastened to the reactor mast 2, the movable structure 41 and the cascade vanes 43 wrapping the engine 30. FIG. 16 illustrates the disassembly of the movable structure 41 and of the cascade vanes 43, after which the engine 30 can be detached from the reactor mast 2.

Such a disassembly and corresponding reassembly considerably extend the duration of a maintenance operation when a dismount of the engine is required.

SUMMARY

This section provides a general summary of the disclosure and is not a comprehensive disclosure of its full scope or all of its features.

The present disclosure provides a thrust reverser and a maintenance method adapted to reduce the duration of a maintenance operation requiring a dismount of the engine.

In one form, the present disclosure relates to a thrust reverser for an aircraft propulsion unit, this thrust reverser comprising two beams arranged so as to be fastened, preferably in a removable manner, on a reactor mast of the propulsion unit, each of these beams including a primary rail, a movable structure linked to the primary rails according to a sliding connection enabling a translation of the movable structure between a direct thrust position and a thrust reversal position, the movable structure including outer cowls movable between a closed position and a maintenance position. The thrust reverser further comprises hinges to which the outer cowls are linked according to a pivot connection enabling the rotation thereof between the closed position and the maintenance position, secondary rails arranged so as to be fastened on the reactor mast of the propulsion unit independently of the beams, the hinges being linked to these secondary rails according to a sliding connection enabling a translation of the outer cowls between a direct thrust position and a thrust reversal position.

The presence of secondary rails and of hinges linking the outer cowls to the secondary rails allows making opening of the outer cowls independent of the other portions of the movable structure.

Thus, it is possible to put down the engine without disassembling the entire thrust reverser beforehand given the reduced bulk of the outer cowls.

We have discovered that, in comparison with a conventional thrust reverser, a thrust reverser in accordance with the present disclosure allows reducing by half the duration of a maintenance operation including a dismount of the engine.

In another form, the thrust reverser may comprise cascade vanes. These cascade vanes may be movable in translation between a direct thrust position and a thrust reversal position.

In still another form, the thrust reverser may comprise an anti-rotation device arranged so as to inhibit the rotation of the hinges about an axis parallel to an axis of rotation of the outer cowls. Such an anti-rotation device allows avoiding or limiting a damage of the secondary rails by the action of the torque exerted by the outer cowls during opening thereof and/or, when the outer cowls are in the maintenance position, by the wind action.

In yet another form, the anti-rotation device may comprise, for at least one hinge and corresponding secondary rail, a support element fixed with respect to the secondary rail and a blocking pin linked to the support element and passing through an opening formed in the hinge. Preferably, said hinge opening may define said axis of rotation of the corresponding outer cowl.

In another form, the thrust reverser may comprise removable fastening means arranged so as to drive the outer cowls in translation when the movable structure is displaced between the direct thrust position and the thrust reversal position. Alternatively to or complementarily with such fastening means, the outer cowls and one or several other element(s) of the movable structure may comprise cooperation means ensuring driving of the outer cowls when the movable structure is displaced between the direct thrust position and the thrust reversal position. For example, these cooperation means may be arranged so as to couple the outer cowls to said other elements of the movable structure when the outer cowls are in the closed position, and so as to uncouple the outer cowls from said other elements of the movable structure when the outer cowls are in the maintenance position.

According to one form, the present disclosure also discloses an aircraft propulsion unit comprising a reactor mast and a thrust reverser as described hereinabove.

According to still another form, the present disclosure also discloses a method for maintaining such an aircraft propulsion unit, this method comprising positioning the outer cowls in the maintenance position, and putting down the beams and the portions of the movable structure other than the outer cowls.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 14:
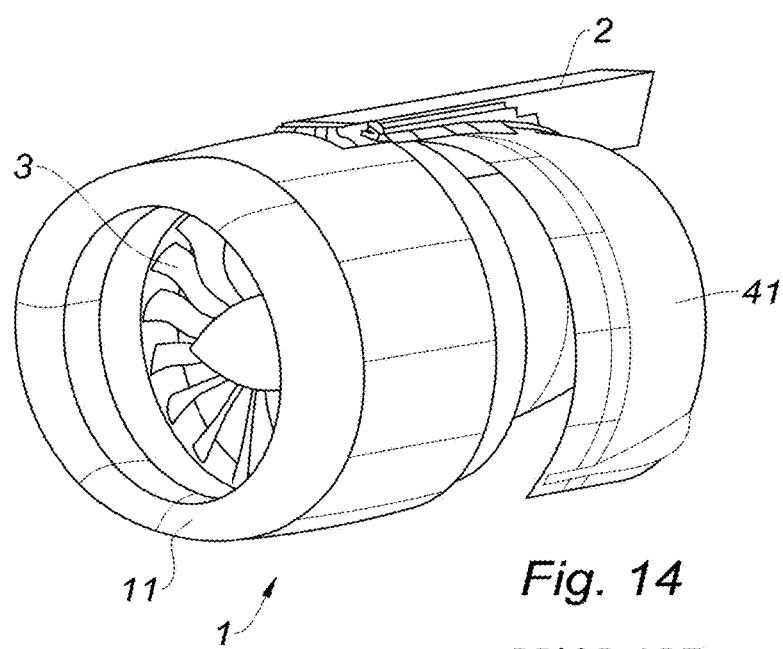
Figure 15:
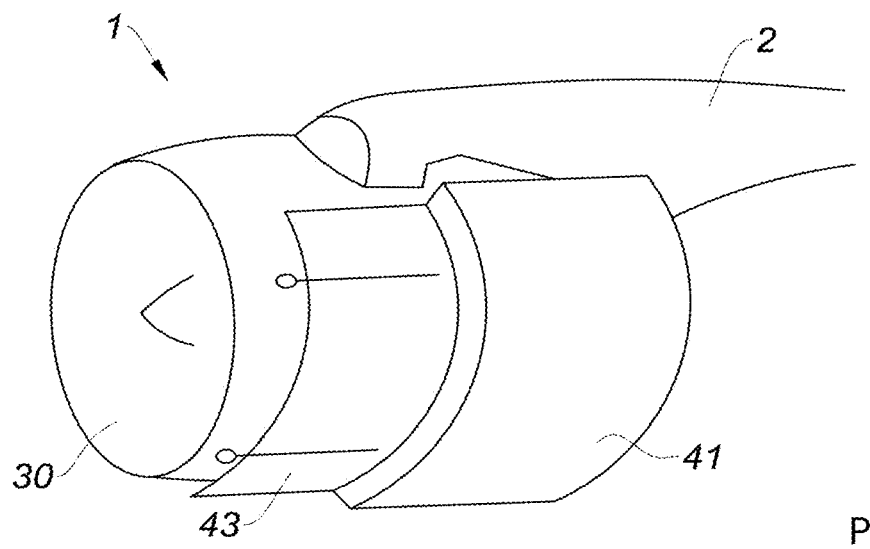
Figure 16:
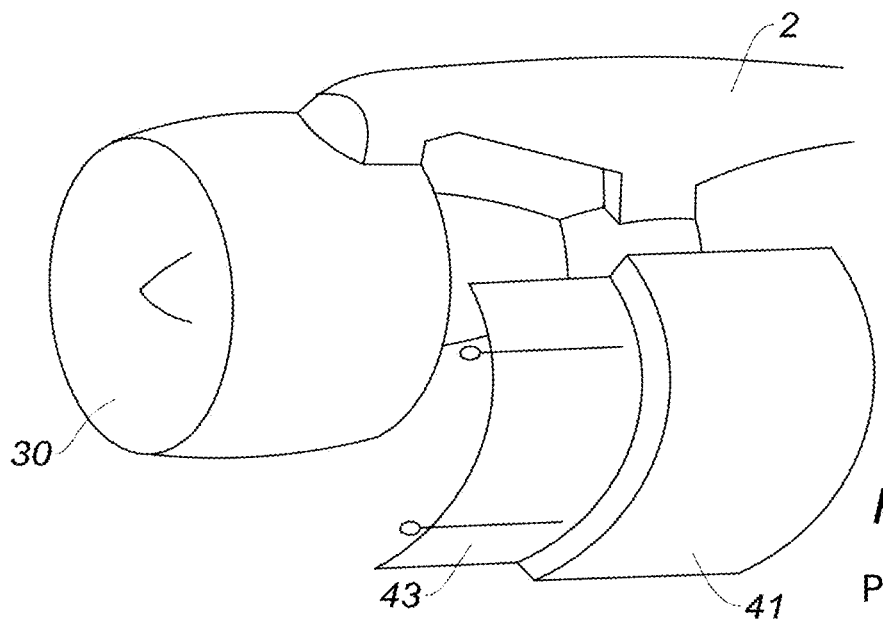

FIG. 14 is a schematic perspective view of a propulsion unit of the prior art, comprising a thrust reverser in the maintenance position; and FIG. 15 is a schematic perspective view of portions of a propulsion unit of the prior art, comprising a thrust reverser with movable cascade vanes in the direct thrust position; and FIG. 16 is a schematic perspective view of portions of a propulsion unit of the prior art, comprising a thrust reverser with movable cascade vanes and the thrust reverser detached from the reactor mast.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all figures, identical or similar elements bear identical reference signs.

Figure 1:
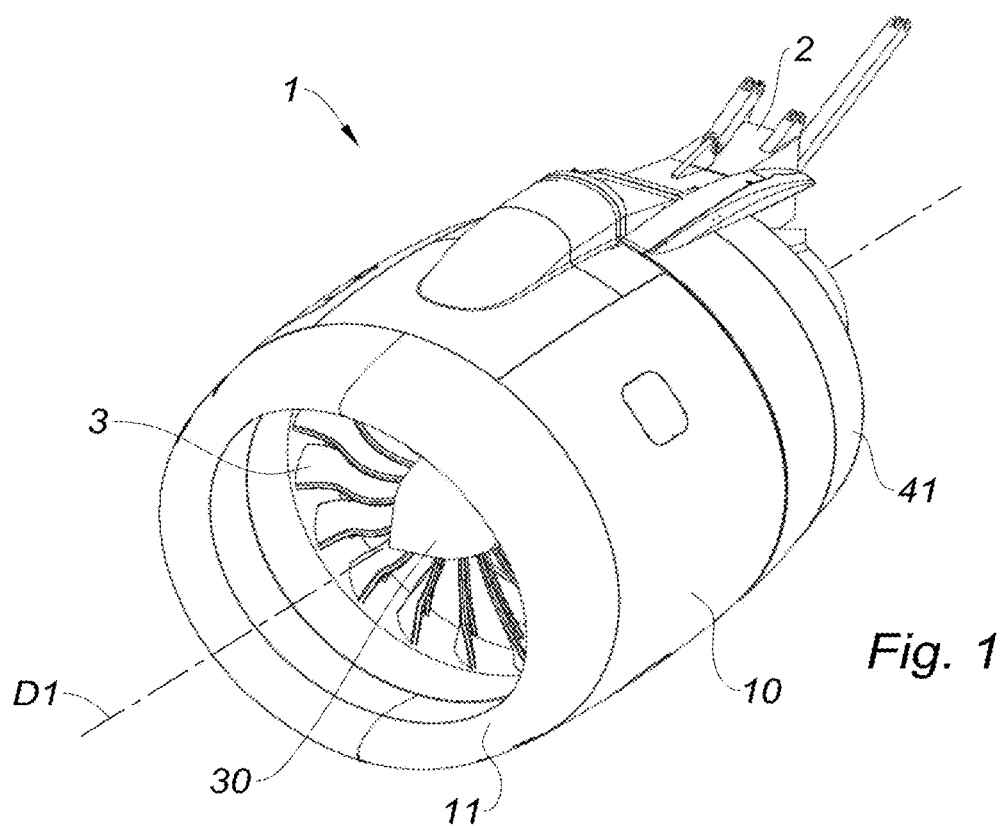
FIG. 1 is a schematic perspective view of a propulsion unit with a thrust reverser with movable cascade vanes in the direct thrust position.

The present disclosure discloses a thrust reverser for a propulsion unit 1 as illustrated in FIG. 1.

This propulsion unit 1 comprises a nacelle housing an engine 30 of the bypass turbojet engine type, as well as a reactor mast 2, represented in part, intended to be fastened to a wing (not represented) of an aircraft (not represented).

The nacelle comprises an air inlet 11 adapted to enable an improved capture towards the engine 30 of air that is desirable for feeding a fan 3 and inner compressors (not represented) of the engine.

The propulsion unit 1 extends according to a direction D1 passing through the axis of the engine 30.

Figure 2:
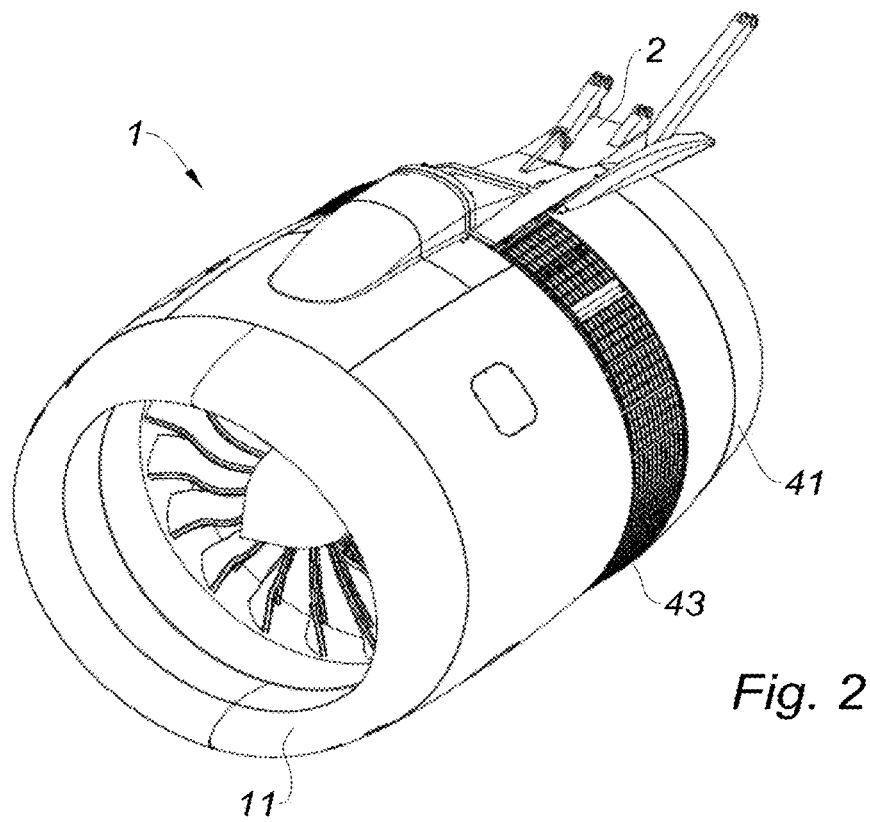
FIG. 2 is a schematic perspective view of the propulsion unit of FIG. 1, the thrust reverser being in the thrust reversal position.

This propulsion unit 1 includes a thrust reverser comprising a movable structure 41 and cascade vanes 43 shown in particular in FIG. 2.

The movable structure 41 is intended to slide along the direction D1 between a direct thrust position (FIG. 1) and a thrust reversal position (FIG. 2).

Figure 4:
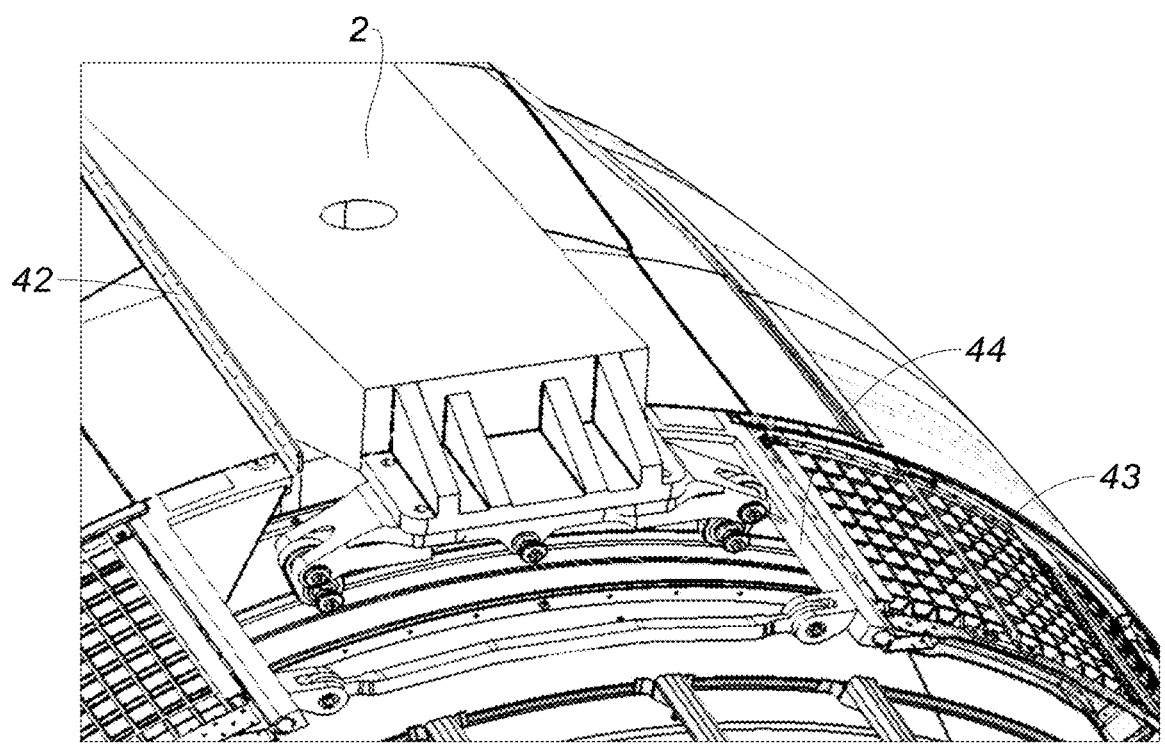
FIG. 4 is a schematic perspective view of a portion of the propulsion unit of FIG. 1, showing the cascade vanes and displacement rails of the cascade vanes in the direct thrust position.
Figure 5:
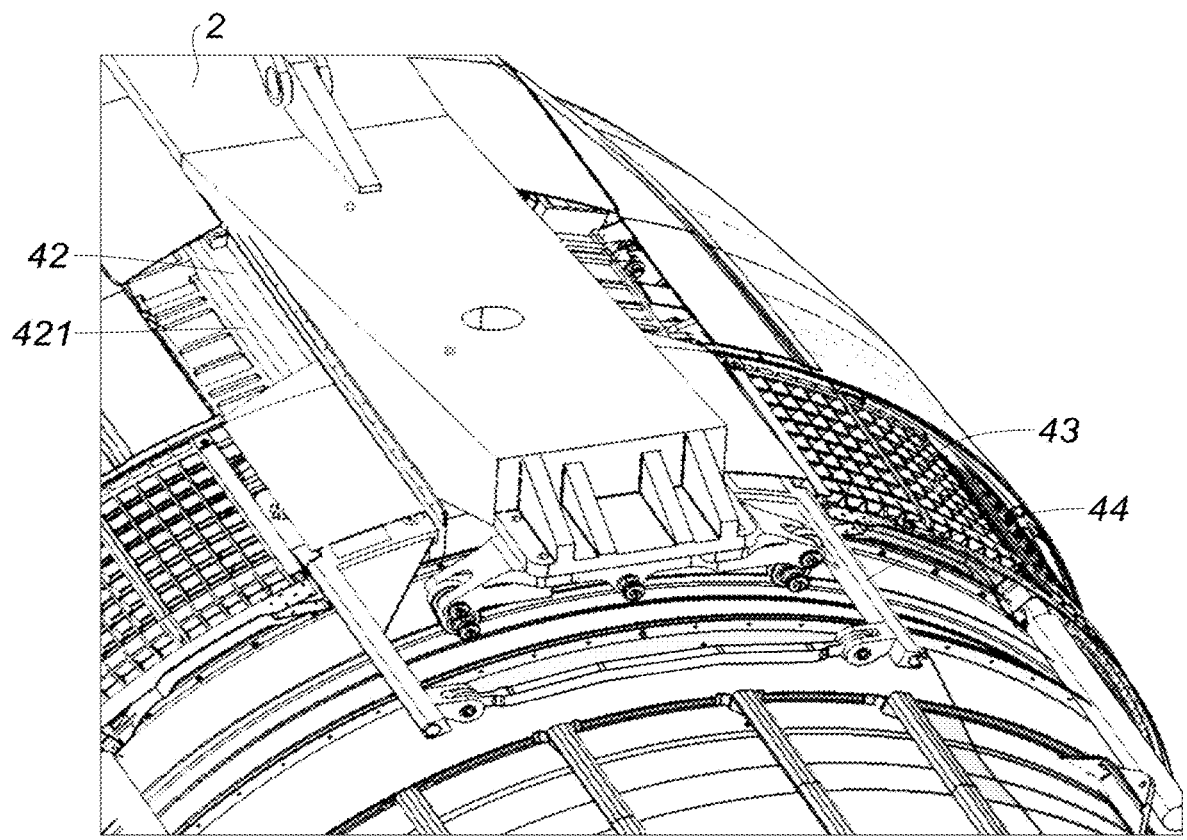
FIG. 5 is a schematic perspective view of a portion of the propulsion unit of FIG. 1, showing the cascade vanes and displacement rails of the cascade vanes in the thrust reversal position.

In this example, the cascade vanes 43 are movable in translation, along the direction D1, between a direct thrust position (FIGS. 3 and 4) and a thrust reversal position (FIG. 5).

When in direct thrust, the movable structure 41 as well as the cascade vanes 43 are in the direct thrust position, the cascade vanes 43 then being covered by the fairing 10 of the nacelle (cf. FIG. 1).

When in thrust reversal, the movable structure 41 as well as the cascade vanes 43 are in the thrust reversal position, the cascade vanes 43 then being uncovered between the fairing 10 and the movable structure 41 (cf. FIG. 2).

For merely illustrative purposes, FIGS. 1, 2 and 6 to 13 show only a first half-portion of the movable structure, denoted by the reference numeral 41 or else by the reference numerals 411 and 412 (cf. below). Of course, the movable structure comprises a second half-portion symmetrical to the first half-portion and operating in a similar way. Thus, all what has been described in the present disclosure with regards to the first half-portion 41 applies mutatis mutandis to said second portion which is not represented in these figures. To simplify the present description, features pertaining to the movable structure in its entirety are described with reference in the figures only to said first half-portion of this movable structure.

Figure 3:
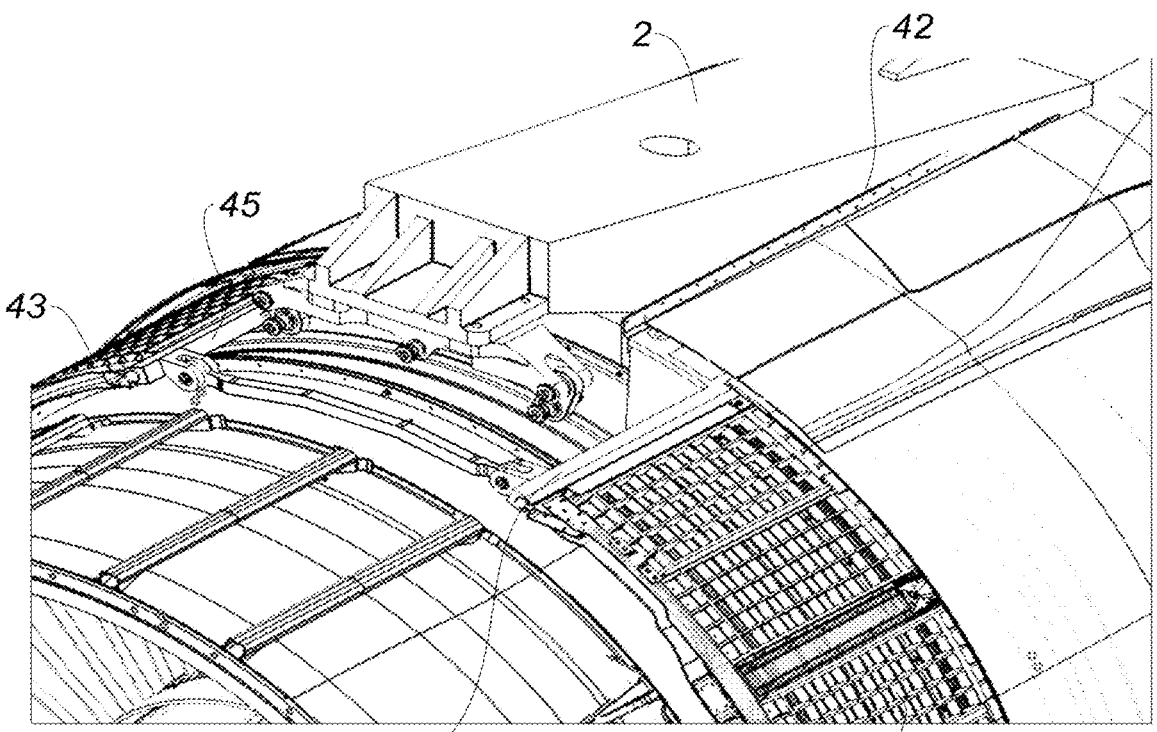
FIG. 3 is a schematic perspective view of a portion of the propulsion unit of FIG. 1, showing the cascade vanes and displacement rails of the cascade vanes in the direct thrust position.

The translation of the movable structure 41 between the direct thrust position and the thrust reversal position is achieved via primary rails 421 made or housed within respective beams 42 (cf. FIGS. 3 to 5). For this purpose, the movable structure 41 is linked to these primary rails 421 according to a sliding connection.

The translation of the cascade vanes 43 between the direct thrust position and the thrust reversal position is achieved via cascades vanes rails 44 and 45 located on either side of the reactor mast 2 (cf. FIGS. 3 to 5). For this purpose, the cascade vanes 43 are linked to these cascade vanes rails 44 and 45 according to a sliding connection.

Referring to FIGS. 6 to 9, the movable structure 41 includes outer cowls 411 movable between a closed position and a maintenance position. The outer cowls 411 are represented in the closed position in FIGS. 1, 2, 6, 8 and 10 to 12. They are represented open, in the maintenance position, in FIGS. 7, 9 and 13.

Figure 6:
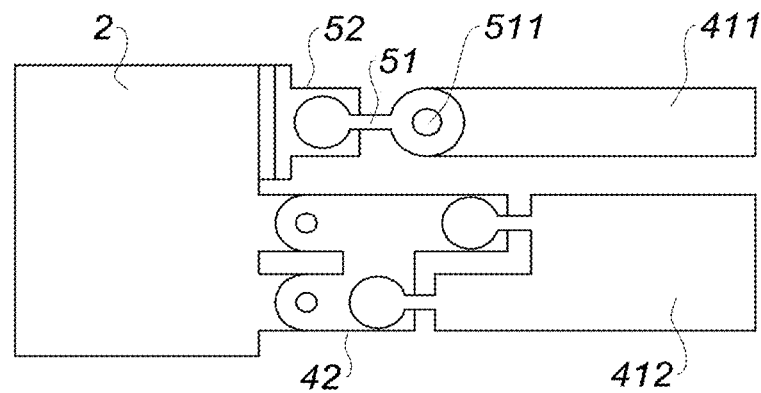
FIG. 6 is a schematic view of a reactor mast and a thrust reverser according to the present disclosure, illustrating in particular the principle of structural detachment of an outer cowl with respect to the other elements of the movable structure in the closed position and the other elements of the movable structure linked to the reactor mast.
Figure 7:
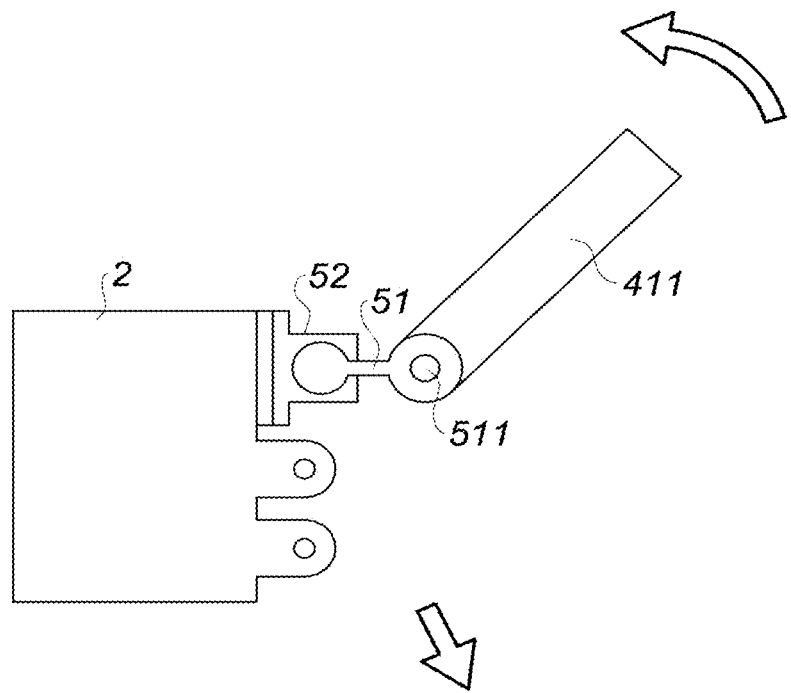
FIG. 7 is a schematic view of a reactor mast and a thrust reverser according to the present disclosure showing the outer cowl in the maintenance position and the other elements of the movable structure detached from the reactor mast.
Figure 8:
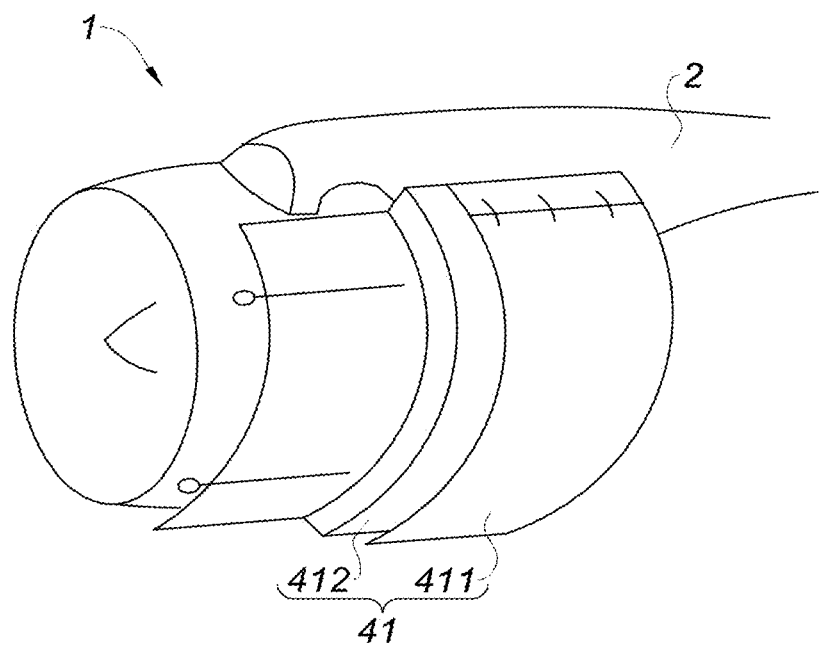
FIG. 8 is a schematic perspective view of a propulsion unit according to the present disclosure, with a thrust reverser with movable cascade vanes in the direct thrust position.

The thrust reverser according to the present disclosure comprises secondary rails 52 arranged so as to be fastened on the reactor mast 2 of the propulsion unit 1 independently of the beams 42, as illustrated for example in FIGS. 6 and 7. These secondary rails 52 are not represented in FIGS. 3 to 5.

Furthermore, the thrust reverser according to the present disclosure comprises hinges 51 linked to the secondary rails 52 according to a sliding connection enabling a translation of the outer cowls 411 between a direct thrust position (FIG. 1) and a thrust reversal position (FIG. 2).

As non-limiting examples, the translation of the outer cowls 411 between the direct thrust position and the thrust reversal position may be achieved by removable fasteners arranged so as to drive the outer cowls 411 in translation when the other portions 412 of the movable structure 41 are displaced between the direct thrust position and the thrust reversal position, and/or by means for cooperation between the outer cowls 411 and said other portions 412 of the movable structure 41, and/or by specific actuators (not represented).

Figure 9:
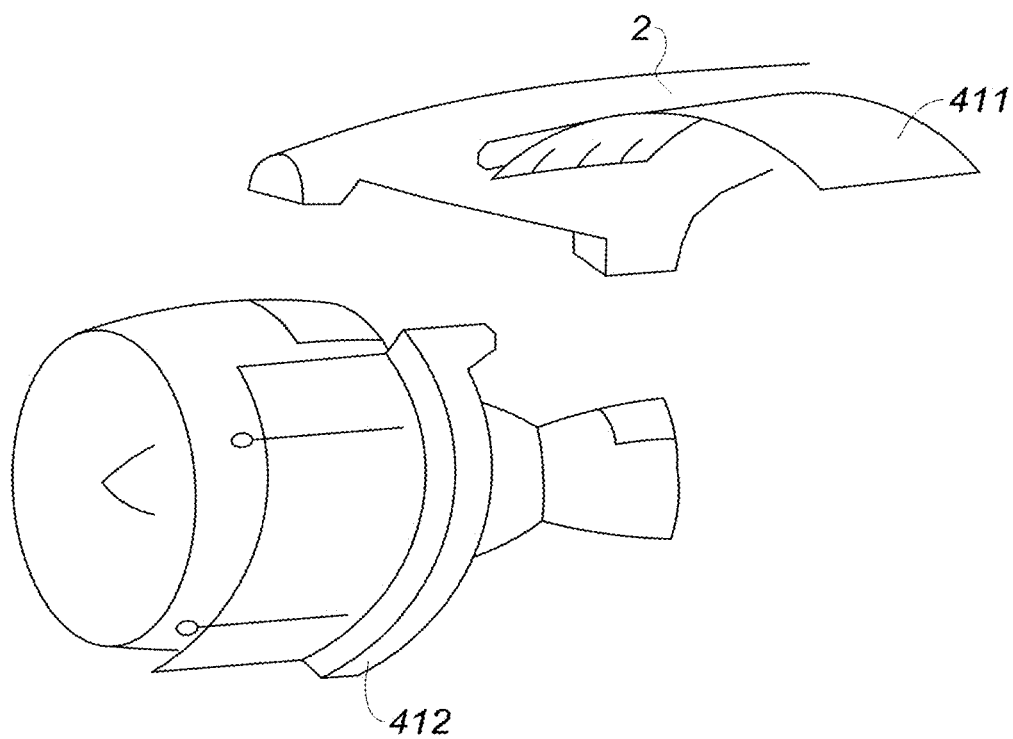
FIG. 9 is a schematic perspective view of the propulsion unit of FIG. 8, the outer cowl being in the maintenance position, the engine and the other elements of the thrust reverser being detached from the reactor mast.
Figure 10:
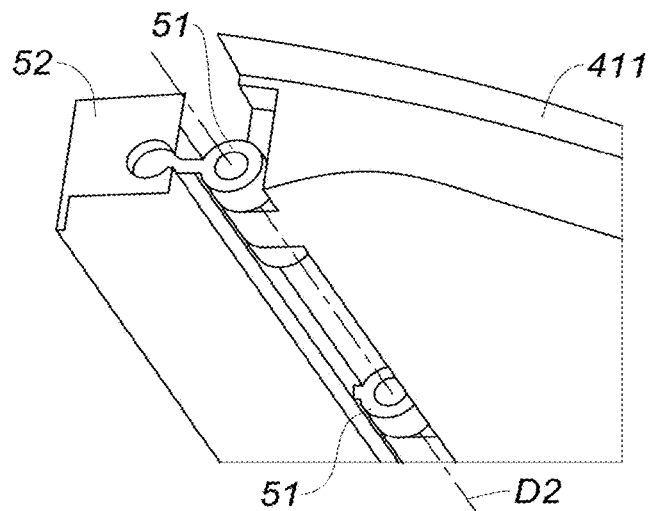
FIG. 10 is a schematic perspective view of a portion of a thrust reverser according to the present disclosure, showing a hinge linking an outer cowl to a secondary rail.

The outer cowls 411 are linked to the hinges 51 according to a pivot connection enabling the rotation thereof between the closed position (FIGS. 6 and 8) and the maintenance position (FIGS. 7 and 9). In this example, the rotation of the outer cowls 411 is achieved about a respective axis of rotation D2 parallel to the direction D1 (cf. FIG. 10).

Thanks to such a thrust reverser, it is possible to carry out a maintenance operation involving a dismount of the engine more rapidly while keeping a thrust reverser with a movable structure enabling outward opening.

A corresponding maintenance method typically comprises a step of positioning the outer cowls 411 in the maintenance position followed by a step of putting off the beams 42 and the portions 412 of the movable structure 41 other than the outer cowls 411 (cf. FIG. 7).

A dismount of the engine 30 may be carried out during this dismount step or subsequently.

Figure 11:
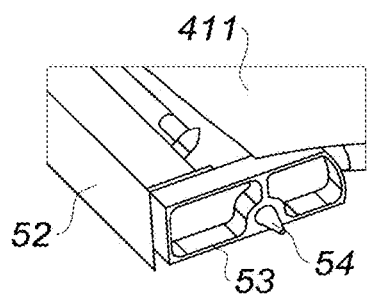
FIG. 11 is a schematic perspective views of a portion of a thrust reverser according to the present disclosure, equipped with an anti-rotation device in the direct thrust position.
Figure 12:
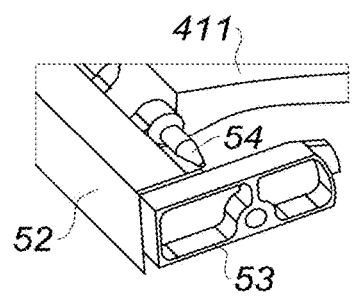
FIG. 12 is a schematic perspective views of a portion of a thrust reverser according to the present disclosure, equipped with an anti-rotation device and showing the thrust reverser in the thrust reversal position.
Figure 13:
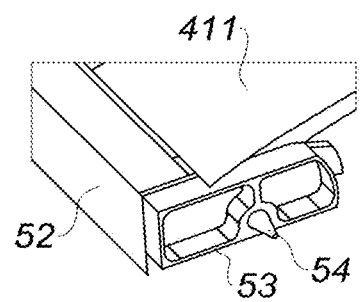
FIG. 13 is a schematic perspective views of a portion of a thrust reverser according to the present disclosure, equipped with an anti-rotation device and showing the outer cowl in the maintenance position.

In one form, the thrust reverser comprises an anti-rotation device as illustrated in FIGS. 11 to 13.

This anti-rotation device is arranged so as to inhibit the rotation of the hinges 51 about an axis parallel to the axis D2 of rotation of the outer cowls 411.

In this example, the anti-rotation device comprises, one of the hinges 51 of the secondary rail 52, a support element 53 fixed with respect to the secondary rail 52 and a blocking pin 54 linked to the support element 53 and passing through an opening 511 formed in the hinge 51 (also cf. FIGS. 6 and 7).

In this example, this hinge 51 opening 511 defines said axis D2 of rotation of the corresponding outer cowl 411.

Of course, the present disclosure is not limited to the examples that have just been described and many modifications may be brought to these examples yet without departing from the scope of the invention. For example, the anti-rotation device may comprise a support element 53 and a corresponding blocking pin 54 on either side of each outer cowl 411.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for an aircraft propulsion unit, the thrust reverser comprising:
    two beams arranged so as to be removably fastened on a reactor mast of the aircraft propulsion unit, each of the two beams including a primary rail;
    a movable structure linked to the primary rails according to a sliding connection enabling a translation of the movable structure between a first direct thrust position and a first thrust reversal position, the movable structure including outer cowls movable between a closed position and a maintenance position;
    hinges to which the outer cowls are linked according to a pivot connection enabling rotation thereof between the closed position and the maintenance position; and
    secondary rails fastened on the reactor mast of the propulsion unit independently of the two beams, the hinges being linked to the secondary rails according to a sliding connection enabling a translation of the outer cowls between a second direct thrust position and a second thrust reversal position.

2. The thrust reverser according to claim 1, further comprising cascade vanes.

3. The thrust reverser according to claim 2, wherein the cascade vanes are movable in translation between a third direct thrust position and a third thrust reversal position.

4. The thrust reverser according to claim 1, further comprising an anti-rotation device arranged so as to inhibit rotation of the hinges about an axis parallel to an axis of rotation of the outer cowls.

5. The thrust reverser according to claim 4, wherein the anti-rotation device comprises, for at least one of the hinges and a corresponding one of the secondary rails, a support element fixed with respect to the corresponding one of the secondary rails and a blocking pin linked to the support element and passing through an opening formed in the at least one hinge.

6. The thrust reverser according to claim 5, wherein said hinge opening defines said axis of rotation of a corresponding one of the outer cowls.

7. The thrust reverser according to claim 1, further comprising removable fasteners arranged so as to drive the outer cowls in translation when the movable structure is displaced between the first direct thrust position and the first thrust reversal position.

8. An aircraft propulsion unit comprising a reactor mast and a thrust reverser according to claim 1.

9. A method for maintaining an aircraft propulsion unit according to claim 8, the method comprising:
- positioning the outer cowls in the maintenance position; and
- putting down the two beams and portions of the movable structure other than the outer cowls.

\* \* \* \* \*